(12) United States Patent
Narita et al.

(10) Patent No.: US 7,377,481 B2
(45) Date of Patent: May 27, 2008

(54) SOLENOID VALVE

(75) Inventors: Masaru Narita, Tsukubamirai (JP);
Hideharu Sato, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 40 days.

(21) Appl. No.: 11/452,972

(22) Filed: Jun. 15, 2006

(65) Prior Publication Data

US 2007/0001140 A1    Jan. 4, 2007

(30) Foreign Application Priority Data

Jul. 1, 2005    (JP) .............................. 2005-194109

(51) Int. Cl.
*F16K 31/12*    (2006.01)
(52) U.S. Cl. ................... 251/129.15; 137/884
(58) Field of Classification Search ........... 251/129.15; 137/884
See application file for complete search history.

(56) References Cited

U.S. PATENT DOCUMENTS

| | | | |
|---|---|---|---|
| 5,558,126 A * | 9/1996 | Hayashi et al. ........ | 137/625.64 |
| 5,579,741 A * | 12/1996 | Cook et al. ................. | 123/516 |
| 6,109,298 A * | 8/2000 | Kaneko et al. ............. | 137/551 |
| 6,662,825 B2 * | 12/2003 | Frank et al. ................. | 137/557 |
| 7,118,087 B2 * | 10/2006 | Miyazoe et al. .............. | 251/26 |

FOREIGN PATENT DOCUMENTS

| | | |
|---|---|---|
| DE | 691 08 228 T2 | 10/1995 |
| DE | 698 09 501 T2 | 9/2003 |
| DE | 698 17 677 T2 | 7/2004 |
| EP | 0 511 339 B1 | 3/1995 |
| EP | 0 883 142 B1 | 12/1998 |
| JP | 5-18537 | 5/1993 |
| JP | 2001-116162 | 4/2001 |

* cited by examiner

*Primary Examiner*—John K. Fristoe, Jr.
(74) *Attorney, Agent, or Firm*—Oblon, Spivak, McClelland, Maier & Neustadt, P.C.

(57) ABSTRACT

A pair of terminal insertion holes are formed to the end wall portion of an magnetic cover in an electromagnetic manipulator, a pair of coil terminals electrically conductive to an exiting coil are extended from a first flange portion of a bobbin in parallel with the axial line of the bobbin as well as extended to the outside of the end wall portion passing through the terminal insertion holes in an electrically insulated state due to the interposition of rubber bushes, a print board electrically connected to the coil terminals and an electrically insulating protection cover for covering the print board are disposed above the outside surface of the end wall portion, and power receiving terminals to which a power supply external connector is connected are disposed to the print board.

7 Claims, 5 Drawing Sheets

SOLENOID VALVE

TECHNICAL FIELD

The present invention relates to a solenoid valve arranged by coupling a main valve portion having a valve member for switching a flow path with an electromagnetic manipulator for manipulating the valve member along an axial line.

BACKGROUND ART

The following patent documents 1 and 2 disclose linear moving type solenoid valves each formed by coupling a main valve portion having a valve member for switching a flow path in series with an electromagnetic manipulator for manipulating the valve member along an axial line.

Patent document 1: Japanese Utility Model Application Publication No. 5-18537

Patent Document 2: Japanese Unexamined Patent Application Publication No. 2001-116162

In these solenoid valves, the electromagnetic manipulator has a rectangular cylindrical magnetic cover having one end closed and the other end opened, a hollow bobbin accommodated in the magnetic cover, an exciting coil wound around the bobbin, a fixed iron core and a movable iron core accommodated in the inside hole of the bobbin, and a pair of coil terminals extending from one end of the bobbin in a direction perpendicular to the axial line. The coil terminals extend to the outside passing through terminal insertion holes formed on a side surface of the magnetic cover. When the electromagnetic manipulator is assembled, a coil assembly is formed by previously assembling the exciting coil and the coil terminals to the bobbin, and the coil assembly is accommodated in the magnetic cover.

However, when the coil terminals extend from a side surface of the coil assembly in the direction perpendicular to the axial line as described above, the coil assembly cannot be accommodated in the magnetic cover in a straight attitude. Accordingly, the terminal insertion holes of the magnetic cover are formed considerably larger than the thickness of the coil terminals, and the coil assembly is accommodated in the magnetic cover in an inclined state so that the coil terminals are fitted in the terminal insertion holes and then the coil assembly is corrected to the straight attitude.

However, when the terminal insertion holes are formed excessively large, the exciting coil is exposed to the outside through the terminal insertion holes. Therefore, it is necessary to close the terminal insertion holes by plate-shaped seal members specifically formed of synthetic resin, rubber, and the like or to entirely coat the electromagnetic manipulator with a seal member of synthetic resin from the view point of safety. Further, the sectional area of a magnetic path may be reduced by the large terminal insertion holes. Further, after the coil assembly is accommodated in the magnetic cover once in the inclined state, it must be corrected to the straight attitude. Thus, when an assembly job is automatically carried out by a robot, it is troublesome to control the attitude of the coil assembly.

DISCLOSURE OF THE INVENTION

In view of the above conventional drawbacks, it is an object of the present invention to provide a solenoid valve having a simple and rationally designed structure and improved workability in assembly.

To achieve the above object, according to the present invention, in an solenoid valve arranged by coupling a main valve portion having a valve member for switching a flow path and an electromagnetic manipulator for manipulating the valve member with each other along an axis line, the electromagnetic manipulator comprising a hollow bobbin around which an exciting coil is wound, a fixed iron core and a movable iron core accommodated in the inside hole of the bobbin, a rectangular cylindrical magnetic cover which has one end closed by an end wall portion and in which the bobbin is accommodated in a state that the first end in an axial direction faces the end wall portion, and a pair of coil terminals electrically conducting to the exciting coil, the solenoid valve is characterized in that a pair of terminal insertion holes are formed to the end wall portion of the magnetic cover so that the coil terminals are individually inserted thereinto, the coil terminals extend from the first end of the bobbin in parallel with the axial line to the outside of the end wall portion passing through the terminal insertion holes in an electrically insulated state due to the interposition of the rubber bushes, a print board, which is electrically connected to the coil terminals, is disposed on the outside surface of the end wall portion in an electrically insulated state to the end wall portion as well as an electrically insulating protection cover is disposed so as to cove the print board, and power receiving terminals are disposed to the print board to connect an external connector thereto to supply power.

In the present invention, the print board may have such a size as to approximately entirely cover the upper surface of the end wall portion and may be disposed in parallel with the end wall portion, and the protection cover may include a main portion for entirely covering the print board and an extending portion extending from an end of the main portion along a side surface of the magnetic cover and partly covering the side surface, a plurality of terminal taking-out holes may be formed to the extending portion, and the power receiving terminals may project in a direction perpendicular to the axial line through the terminal taking-out holes.

Further, in the present invention, screw holes may be formed to the end wall portion of the magnetic cover as well as screw insertion holes are formed to the protection cover and the print board, and the protection cover may be fixed to the end wall portion by screws through the print board.

Otherwise, the interior of the protection cover may be filled with synthetic resin potting member that may be provided with a function for adhering and fixing the protection cover to the magnetic cover and a function for electrically insulating between the magnetic cover and the print board, and the power receiving terminals.

According to the present invention, the terminal insertion holes formed to the magnetic cover can be formed to such a small size that they can be closed by rubber bushes that permit the coil terminals to be passed through the terminal insertion holes in an electrically insulated state. As a result, the terminal insertion holes can be closed by a simple arrangement as well as the sectional area of a magnetic path formed by the magnetic cover is not unnecessarily reduced. Further, since a coil assembly can be assembled in the magnetic cover in a straight attitude, an assembly job can be simplified.

BEST MODE FOR CARRYING OUT THE INVENTION

FIGS. 1 to 4 show a linear moving type solenoid valve as a typical embodiment of one of solenoid valves according to the present invention. The solenoid valve is composed of a main valve portion 1 having a valve member 4 for switching a fluid flow path and an electromagnetic manipulator 2 for manipulating the valve member 4, and the main valve portion 1 and the electromagnetic manipulator 2 are coupled with each other in a series state in the direction of the axial line L of the solenoid valve.

Figure 3:
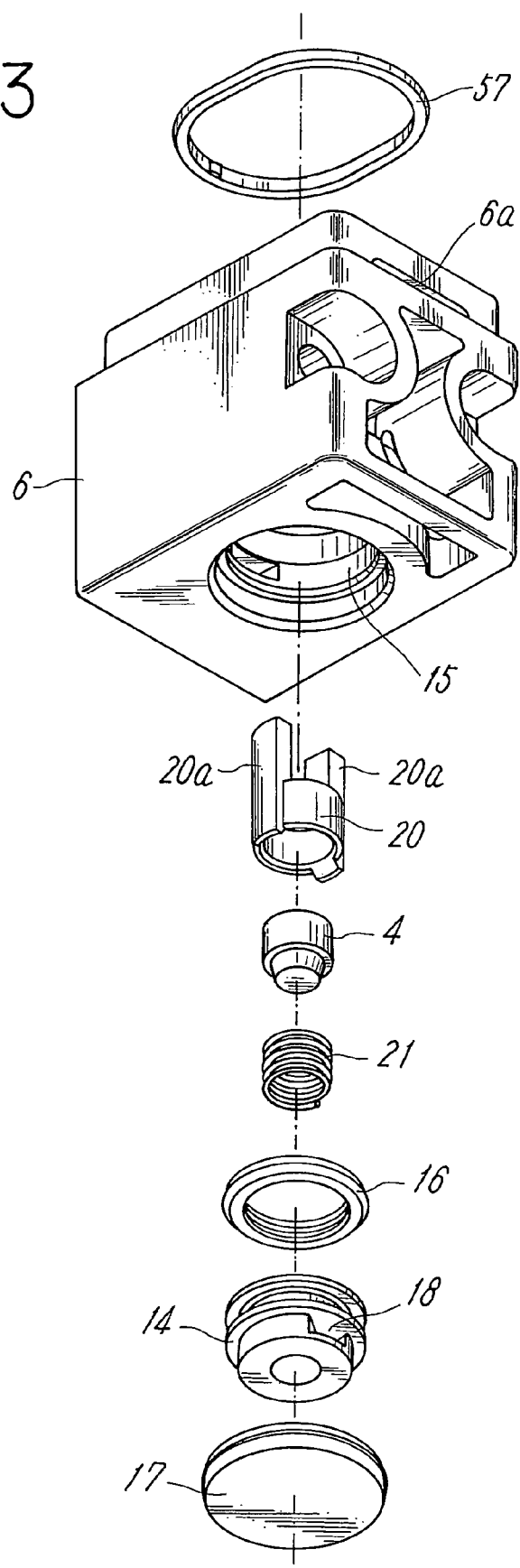
FIG. 3 is an exploded perspective view showing a main valve portion of the solenoid valve of FIG. 1.

As can be seen from FIG. 3, the main valve portion 1 includes a housing 6 having a rectangular sectional shape and composed of a non-magnetic material. A feed port P, an output port A, and a discharge port R are disposed on a side surface of the housing 6, a circular valve chamber 7 is formed in the housing 6 at a position on the axial line L, and the respective ports P, A, R communicate with the valve chamber 7. The feed port P and the discharge port R of these ports communicate with the valve chamber 7 at positions where they confront with each other, and the output port A communicates with the valve chamber 7 at a position between them. More specifically, the feed port P communicates with the inside of the valve chamber 7 through a feed orifice 10 formed at a position on the axial line L on the bottom wall of the valve chamber 7, the discharge port R communicates with the inside of the valve chamber 7 through a discharge orifice 11 formed at a position on the axial line L on the top wall of the valve chamber 7, and the output port A communicates with the inside of the valve chamber 7 through an output orifice 12 formed on a side wall of the valve chamber 7.

Further, the valve member 4 of a poppet type is accommodated in the valve chamber 7 so as to be free to shift in the direction of the axial line L, and these orifices 10, 11 can be opened and closed by manipulating the valve member 4 by the electromagnetic manipulator 2 to cause a feed valve seat 10a around the feed orifice 10 to come into contact with and to separate from a discharge valve seat 11a around the discharge orifice 11. Then, when the valve member 4 closes the discharge orifice 11, the feed port P communicates with the output port A from the feed orifice 10 through the valve chamber 7 and the output orifice 12, and when the valve member 4 closes the feed orifice 10, the output port A communicates with the discharge port R from the output orifice 12 through the valve chamber 7 and the discharge orifice 11.

The feed orifice 10 and the feed valve seat 10a are disposed to a retainer 14 for partitioning one end of the valve chamber 7. The retainer 14 is a short columnar member, inserted into an attachment hole 15 connecting to the one end of the valve chamber 7 from an end of the housing 6 through a seal member 16, and attached to the housing 6 by being supported from the outside by a fixing plate 17 locked to the housing 6 airtight. A communication hole 18 communicating with the feed port P is formed in the retainer 14 in a radial direction and communicates with the feed orifice 10.

Further, the valve member 4 is a short columnar member composed of rubber or synthetic resin, held by a synthetic resin valve holder 20 by being fitted in the valve holder 20, and elastically pressed toward the discharge valve seat 11a side by the spring force of a valve return spring 21 interposed between the valve member 4 and the retainer 14. A pair of push rods 20a, which extend in the direction of the axis line L in parallel with each other, are disposed on the right and left side surfaces of the valve holder 20, and the extreme ends of the push rods 20a extend into an iron core chamber 22 formed between the housing 6 and the electromagnetic manipulator 2 through a rod hole formed in the housing 6. The iron core chamber 22 is formed in a recess disposed to the housing 6.

The electromagnetic manipulator 2 includes a square cylindrical magnetic cover 30 formed of a magnetic material such as iron, and disposed in the magnetic cover 30 are a hollow bobbin 31 composed of a non-magnetic material and having an exciting coil 32 wound around it, a magnetic plate 33 composed of a magnetic material and interposed between an end of the hollow bobbin 31 and the housing 6, an inside hole 36 extending across the hollow bobbin 31 and the magnetic plate 33 and a fixed iron core 34 and a movable iron core 35 which are composed of a magnetic material and disposed in the inside hole 36. The magnetic plate 33 is magnetically coupled with the magnetic cover 30 by abutting the outer peripheral portion of it against the inside surface of the magnetic cover 30.

Figure 4:
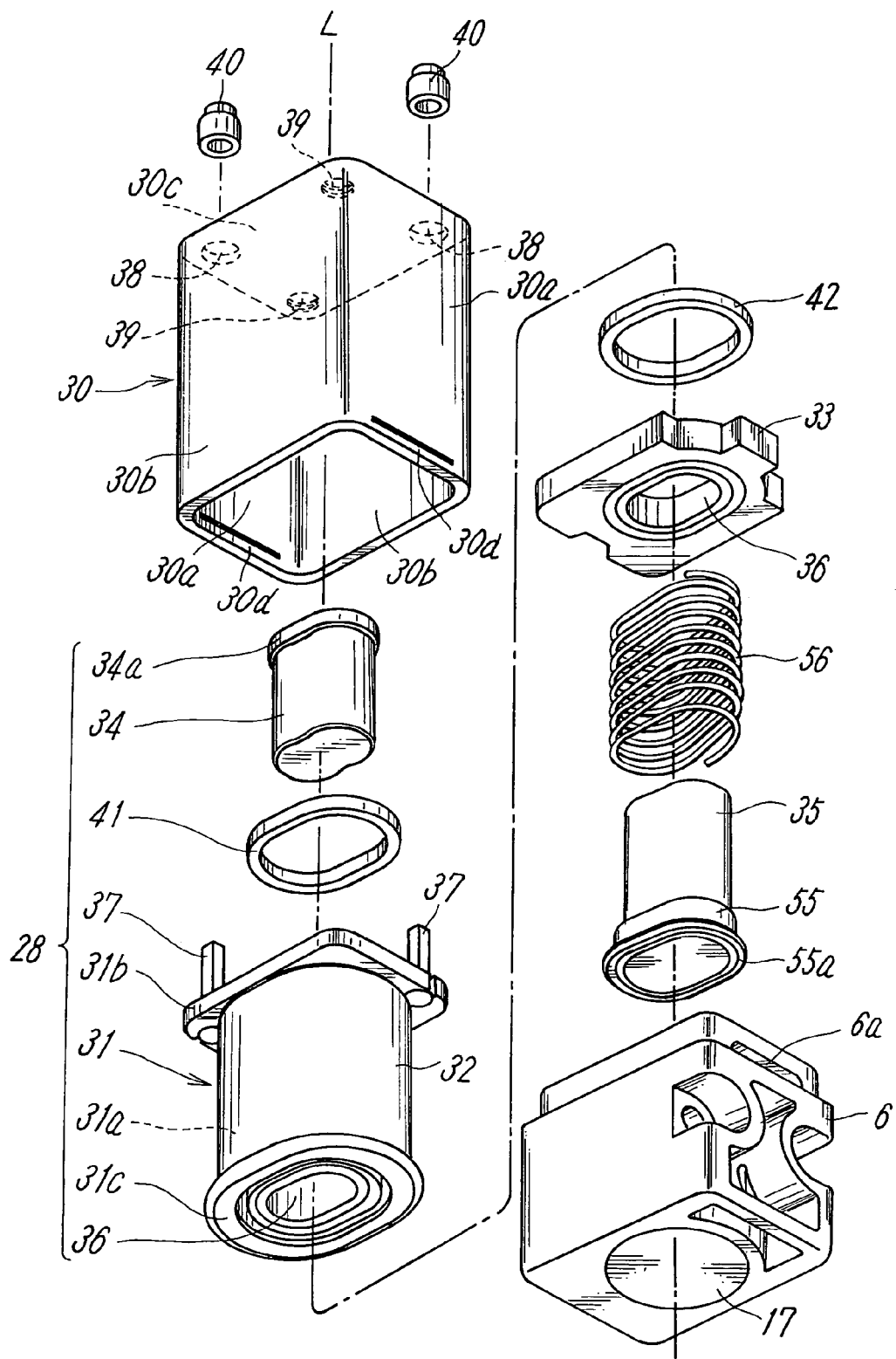
FIG. 4 is an exploded perspective view showing an electromagnetic manipulator of the solenoid valve of FIG. 1.

As apparent also from FIG. 4, the magnetic cover 30 has a rectangular shape whose lateral sectional shape is long in one direction and is composed of four side wall portions 30a, 30a and 30b, 30b and an end wall portion 30c located at one end of the side wall portions in the direction of the axial line L. An end (upper end) of the magnetic cover 30 is closed by the end wall portion 30c, and the other end (lower end) of it is opened. Then, the magnetic cover 30 has locking pieces 30d partitioned by cutouts at positions near to the open ends of the side surfaces 30a, 30a located on both the sides of the magnetic cover 30 in a long diameter direction, and the magnetic cover 30 is coupled with the housing 6 by deforming the locking pieces 30d inward of the magnetic cover 30 and locking them to fitting recesses 6a of side surfaces of the housing 6.

A pair of circular terminal insertion holes 38, 38 are formed to the end wall portion 30c at the positions of corner portions of it that confront with each other along one diagonal line so that a pair of coil terminals 37, 37 extending from the bobbin 31 are inserted through them, and a pair of screw holes 39, 39 are formed at the positions of corner portions that confront with each other along the other diagonal line so that a protection cover 45 to be described later are fixed to them by screws.

The terminal insertion holes 38 preferably have such a size as to cause the rod-shaped coil terminals 37 to be inserted into them in intimate contact with them through cylindrical rubber bushes 40. With this arrangement, since the gaps between the terminal insertion holes 38 and the coil terminals 37 are closed by the rubber bushes 40, special closing plates need not be attached, and thus an arrangement can be simplified. Moreover, since the terminal insertion holes 38 need not be made larger than necessary, the sectional area of the magnetic path arranged by the magnetic cover 30 is not unnecessarily reduced.

The bobbin 31 with an approximately elliptic sectional shape includes a central bobbin main body 31a having the exciting coil 32 wound around the outer periphery of it, a first flange portion 31b formed to the first end of the bobbin main body 31a in the axial line L, and a second flange portion 31c formed to the second end of it opposite to the first end. The first flange portion 31b at the upper end is abutted against the end wall portion 30c of the magnetic cover 30 through a seal member 41, the second flange portion 31c at a lower end is abutted against the magnetic plate 33 through a seal member 45, and the iron core chamber 22 is formed between the magnetic plate 33 and the housing 6.

The pair of square-rod-shaped coil terminals 37, 37, which are electrically conductive to the exciting coil 32, extend from the end surface of the first flange portion 31b in parallel with the axial line of the bobbin 31, that is, in parallel with the axial line L of the solenoid valve and extend to the outside of the end wall portion 30c passing through the terminal insertion holes 38, 38 of the end wall portion 30c of the magnetic cover 30 in an electrically insulated state due to the interposition of the rubber bushes 40.

A rectangular print board 44 is supported by the rubber bushes 40 and disposed above the outside surface of the end wall portion 30c in parallel with it in an insulated state as well as the electrically insulating protection cover 45 is disposed above the print board 44 so as to covers it.

The print board 44 has such a size that it covers approximately the entire upper surface of the end wall portion 30c, and an electric circuit is printed on the surface of it as well as electric parts necessary to manage the operation of the solenoid valve are mounted on the surface as necessary. A pair of terminal connection holes 46, 46 are formed at the positions of corner portions of the print board 44 along one diagonal line of it as well as a pair of screw insertion holes 47, 47 are formed at the positions of corner portions along the other diagonal line of it so that fixing screws 48 are inserted through them to fix the protection cover 45. The extreme ends of the coil terminals 37, 37 are inserted into the terminal connection holes 46 and connected to the electric circuit by soldering.

Further, a pair of power receiving terminals 50, 50 is disposed to an end of the print board 44 so that an external connector is connected to them to supply power. Each of the power receiving terminals 50 is formed by bending a square-rod-shaped wire member to an approximately L-shape and has an attachment portion 50a extending in parallel with the axial line L in non-contact with the magnetic cover 30 and a contact portion 50b extending in a direction perpendicular to the axial line L from the lower end of the attachment portion 50a. Base ends 50c of the attachment portions 50a are bent to a U-shape and electrically connected to the print board 44 by being inserted into terminal connection holes 49 of the print board 44 from an upper surface side and soldered to them.

The protection cover 45 is composed of synthetic resin and includes a rectangular shallow-dish-shaped main portion 45a for entirely covering the print board 44 and an extending portion 45b extending from an end of the main portion 45a downward along the side surface of the magnetic cover 30, to which the power receiving terminals 50 are disposed, and partially covering the side surface.

A pair of screw insertion holes 52, 52 are formed to the positions of corner portions of the main portion 45a along a diagonal line of it, and the protection cover 45 is detachably mounted above the end wall portion 30c of the magnetic cover 30 by the fixing screws 48 inserted into the screw insertion holes 52.

Further, a plurality of longitudinally long terminal taking-out holes 53 are formed to the lower edge of the extending portion 45b, and the contact portions 50b of the power receiving terminals 50 extend in a right-angle direction to the side surface of the magnetic cover 30 through the terminal taking-out holes 53.

Note that when a display lamp is mounted on the print board 44, it is preferable to form a transparent portion at a position of the protection cover 45 corresponding to the display lamp.

The fixed iron core 34 and the movable iron core 35 are disposed in the inside hole 36 formed across the bobbin 31 and the magnetic plate 33 so as to be free to come into contact with and separate from each other. The fixed iron core 34 of them is magnetically coupled with the magnetic cover 30 by that the end surface of it on a base end portion 34a side having a large diameter is abutted against the inner surface of the end wall portion 30c of the magnetic cover 30 as well as the base end portion 34a is sandwiched and fixed between the bobbin 31 and the end wall portion 30c of the magnetic cover 30 by that the base end portion 34a is fitted to a stepped portion 31d formed to the end portion of the bobbin 31 on the first flange portion 31b side of it by increasing the diameter of the inside hole 36.

Further, the extreme end portion 35a with a large diameter of the movable iron core 35 extends from the inside hole 36 into the iron core chamber 22, and a synthetic resin cap 55 is attached to the extreme end portion 35a. The cap 55 has a function of a spring seat for a coil-like iron core return spring 56 that is interposed between a flange-like bulge portion 55a at an extreme end and the magnetic plate 33 to return the movable iron core 35 to an initial position at which it is separated from the fixed iron core 34.

Note that 57 in the figure denotes a seal member interposed between the housing 6 and the magnetic plate 33.

Figure 1:
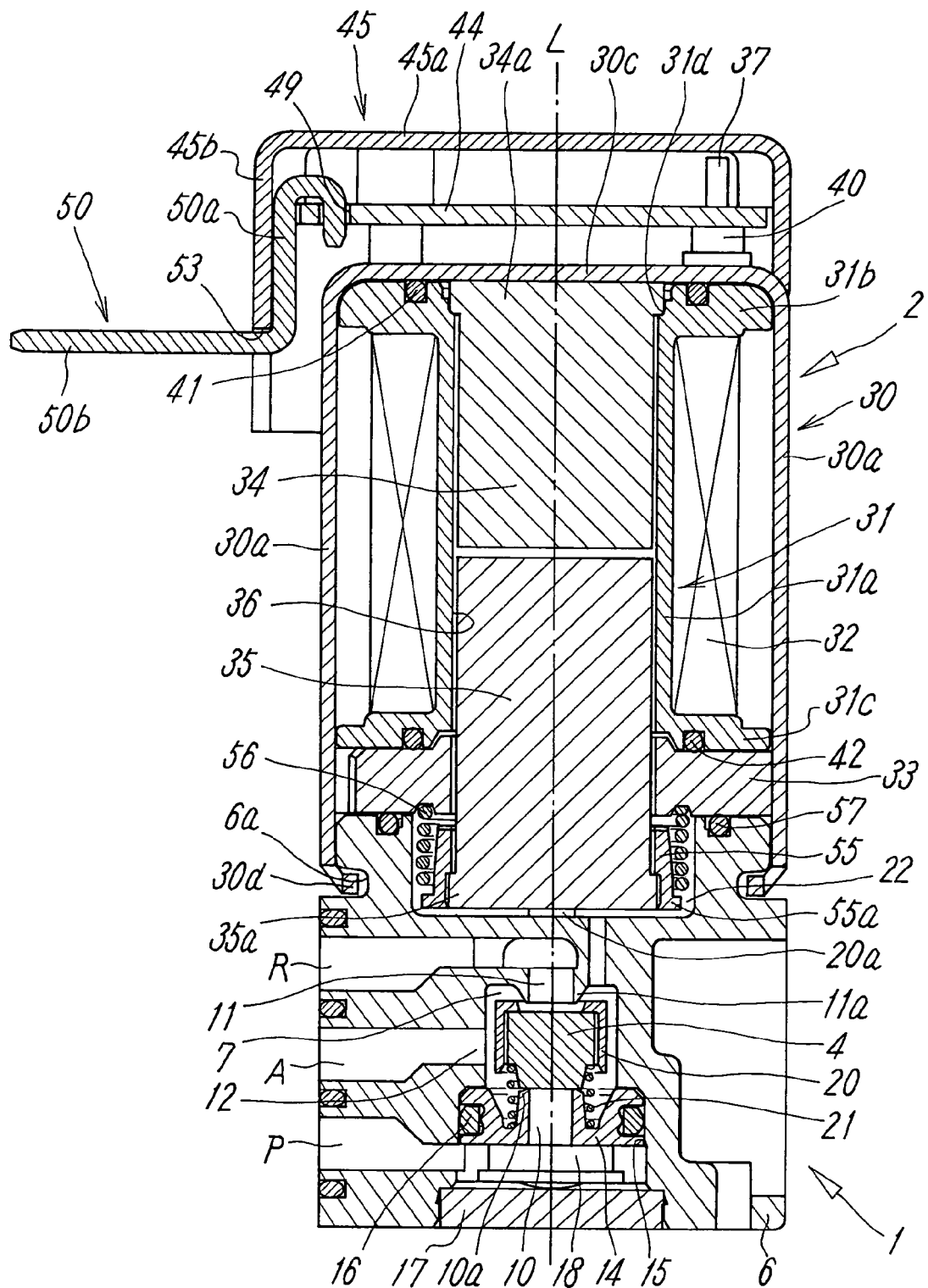
FIG. 1 is a sectional view of a first embodiment of a solenoid valve according to the present invention.

In a state that the exiting coil 32 is not energized in the electromagnetic manipulating portion 2, the movable iron core 35 occupies the initial position at which it is separated from the fixed iron core 34 by the spring force of the iron core return spring 56 as shown in FIG. 1. At the time, since the push rods 20a are pushed by the movable iron core 35 and the valve member 4 is pressed against the feed valve seat 10a, the feed orifice 10 is closed and the discharge orifice 11 is opened, thereby the output port A and the discharge port R communicate with each other through the valve chamber 7. When the exiting coil 32 is energized from this state, since the movable iron core 35 is attracted to the fixed iron core 34 and occupies an operating position, the valve member 4 is pressed against the discharge valve seat 11a by the spring force of the valve return spring 21, thereby the feed orifice 10 is opened and the discharge orifice 11 is closed. Accordingly, the feed port P and the output port A communicate with each other through the valve chamber 7.

When the exciting coil 32 is not energized, the movable iron core 35 is returned to the initial position by the spring force of the iron core return spring 56.

In the solenoid valve, the electromagnetic manipulator 2 is ordinarily assembled to the main valve portion 1 in the following sequence. That is, the seal member 41 is attached to the end surface of the first flange portion 31b of the bobbin 31 around which the exciting coil 32 is wound and to which the coil terminals 37, 37 are attached as well as the fixed iron core 34 is accommodated in the inside hole 36 of the bobbin 31, thereby the coil assembly 28 is previously formed.

Next, the coil assembly 28 is accommodated in the magnetic cover 30 from the open end of it and assembled. At the time, in a conventional solenoid valve in which the coil terminals 37, 37 project in the side surface direction of the bobbin, the coil assembly must be inserted into the magnetic cover 30 in a state that it is inclined once and then must be corrected to a straight attitude. In the above embodiment, however, since the coil terminals 37, 37 project from the end surface of the first flange portion 31b of the bobbin 31 in parallel with the axial line L, the coil assembly 28 can be accommodated in the magnetic cover 30 and assembled to it in a straight attitude without the need of inclining it.

Figure 2:
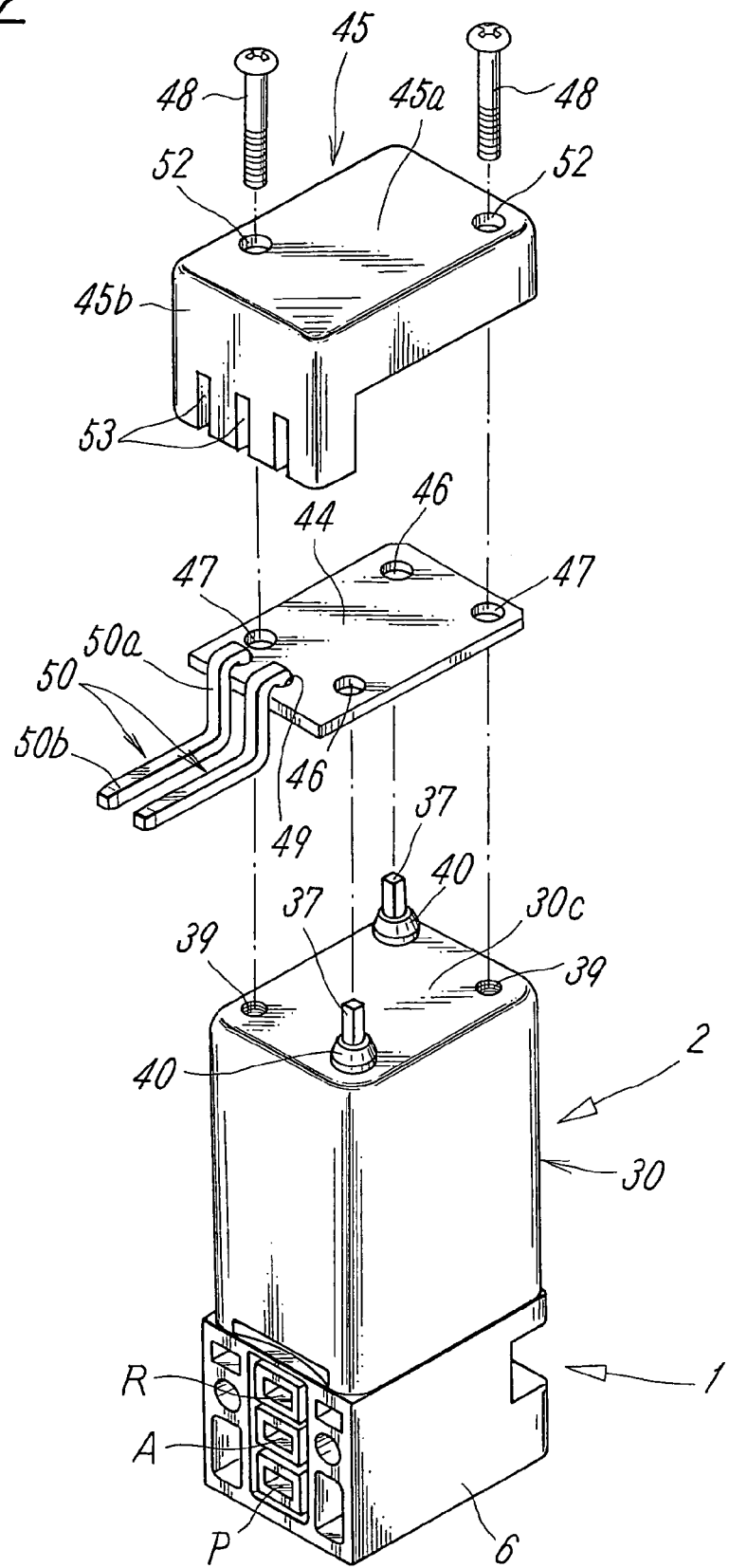
FIG. 2 is a perspective view showing a state in which a protection cover of the solenoid valve of FIG. 1 is separated from a print board.

Moreover, an assembly job can be simplified because it is sufficient to sequentially assemble the print board 44 and the protection cover 45 in the direction of the axial line L after the main valve portion 1 is coupled with the electromagnetic manipulator 2 as shown in FIG. 2.

Note that, although the protection cover 45 is fixed to the magnetic cover 30 by the screws in the illustrated embodiment, it can be also attached to it by other method. There can be used, for example, a method of elastically locking a plurality of elastic locking pieces formed to the protection cover 45 to a plurality of locking holes formed to the magnetic cover 30, a method of adhering the joint portion of the protection cover 45 to the joint portion of the magnetic cover 30 by an adhesive.

Figure 5:
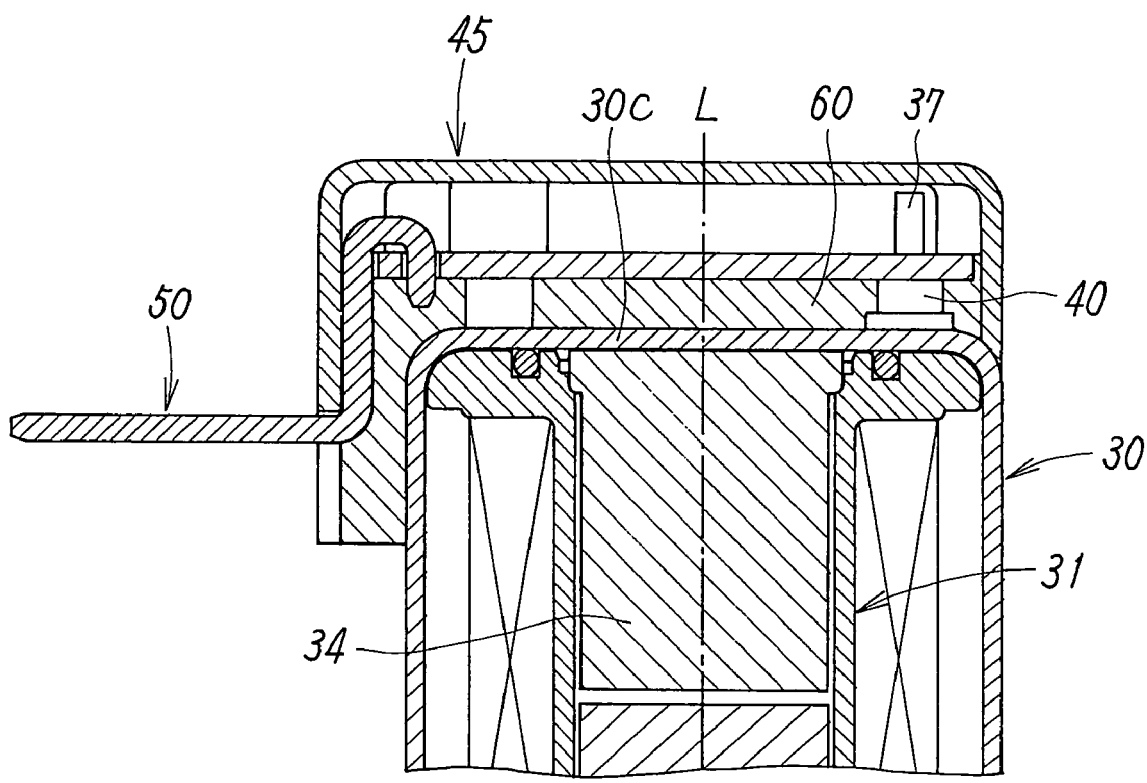
FIG. 5 is a sectional view of a main portion of a second embodiment of the solenoid valve according to the present invention.

Otherwise, as in a second embodiment shown in FIG. 5, the interior of the protection cover 45 is filled with a potting member 60 composed synthetic resin such as epoxy resin or the like, and the potting member 60 may be provided with a function for adhering and fixing the protection cover 45 to the magnetic cover 30 and a function for electrically insulating between the magnetic cover 30 and the print board 44, and the power receiving terminals 50. When the protection cover 45 is filled with the potting member 60, the joint portions of the protection cover 45 and the magnetic cover 30 are tentatively adhered to each other with an instant adhesive as well as a seal agent is applied to the entire peripheries of the joint portions to prevent the potting member in a melted state from protruding from them, the interior of the protection cover 45 is filled with the potting member 60, and the potting member 60 is solidified.

Note that the potting member 60 can be used together with the fixing method using the screws or the fixing method using the elastic locking pieces or the adhesive as shown in the first embodiment.

Although the illustrated solenoid valve is a poppet type three-port valve, the switching system and the number of ports of the solenoid valve are not limited to those shown above. That is, the switching system may be a spool system, and the number of the ports may be two ports, four ports, or five ports.

The invention claimed is:

1. A solenoid valve comprising:
a main valve portion having a valve member for switching a flow path;
an electromagnetic manipulator for manipulating the valve member along an axis line, the electromagnetic manipulator being coupled with the main valve portion and comprising a hollow bobbin around which an exciting coil is wound, a fixed iron core and a movable iron core accommodated in the bobbin, a magnetic cover formed by a rectangular hollow member, which has one end closed by an end wall portion and in which the bobbin is accommodated in a state that the first end in an axial direction faces the end wall portion, and a pair of coil terminals electrically conducting to the exciting coil;
a pair of terminal insertion holes formed to the end wall portion of the magnetic cover so that the coil terminals are individually inserted thereinto, wherein the coil terminals extend from the first end of the bobbin in parallel with the axial line to the outside of the end wall portion, passing through the terminal insertion holes in an electrically insulated state due to the interposition of rubber bushes;
a print board, which is electrically connected to the coil terminals, and is disposed on the outside surface of the end wall portion in an electrically insulated state to the end wall portion;
an electrically insulating protection cover disposed so as to cover the print board; and
power receiving terminals disposed to the print board to connect an external connector for supplying power,
wherein the protecting cover has a rectangular shallow dish shape and includes a main portion and an extending portion, a tip end of a side wall of the main portion abutting against an upper end portion of the magnetic cover in a state to entirely cover the print board, and the extending portion extending from an end of the main portion along one side surface of the magnetic cover and partially covering the side surface in a state to keep a space between the side surface and the extending portion, and a plurality of terminal taking out holes are formed to the extending portion, and
wherein the power receiving terminals project from the protecting cover in a direction perpendicular to the axial line through the terminal taking out holes after extending from the print board along the extending portion through the interior of the space.

2. The solenoid valve according to claim 1, wherein screw holes are formed to the end wall portion of the magnetic cover and screw insertion holes are formed to the protection cover and the print board, and the protection cover is fixed to the end wall portion by screws through the print board.

3. The solenoid valve according to claim 2, wherein the interior of the protection cover is filled with synthetic resin potting material for adhering and fixing the protection cover to the magnetic cover and for electrically insulating between the magnetic cover and the print board, and the power receiving terminals.

4. The solenoid valve according to claim 1, wherein the interior of the protection cover is filled with synthetic resin potting material for adhering and fixing the protection cover to the magnetic cover and for electrically insulating between the magnetic cover and the print board, and the power receiving terminals.

5. The solenoid valve according to claim 1, wherein the terminal taking out holes are longitudinally long holes formed upward from the lower edge of the extending portion.

6. The solenoid valve according to claim 5, wherein screw holes are formed to the end wall portion of the magnetic cover and screw insertion holes are formed to the protection cover and the print board, and the protection cover is fixed to the end wall portion by screws through the print board.

7. The solenoid valve according to claim 5, wherein the interior of the protection cover is filled with synthetic resin potting material for adhering and fixing the protection cover to the magnetic cover and for electrically insulating between the magnetic cover and the print board, and the power receiving terminals.

* * * * *